May 25, 1937.  R. SCHWEICH  2,081,561

CLUTCH

Filed May 19, 1934

INVENTOR
Roger Schweich
BY
his ATTORNEY

Patented May 25, 1937

2,081,561

UNITED STATES PATENT OFFICE 2,081,561

CLUTCH

Roger Schweich, Paris, France, assignor to Pulvis Aktiengesellschaft, Glarus, Switzerland, a corporation of Switzerland Application May 19, 1934, Serial No. 726,431
In France May 20, 1933

16 Claims. (Cl. 192—58)

The present invention relates to a clutch and more particularly to a clutch of the type in which power is transmitted through drifts of finely divided material packed under the influence of centrifugal force. A clutch of this general type is disclosed in U. S. Patent No. 1,830,564 granted Nov. 3, 1931, to C. A. Rudqvist.

One of the objects of this invention is the provision of improved means for preventing the escape, between relatively rotatable members, of the finely divided material from the clutch. This is done by the provision of packing means between the relatively rotatable parts and arranging the means so that slight displacement of one rotating part with respect to the other does not adversely affect the packing.

Another object of the invention is to provide a perforated liner in a clutch of this type, the purpose of which is to give a good engaging surface with which the drifts may cooperate. A liner of this type is much cheaper to construct than a drum having the interior surface thereof corrugated.

Another object of the invention is the provision of a chamber into which the finely divided material may be caused to pass upon disengagement of the clutch to thereby reduce the friction within the clutch after the drifts have been disrupted. In accordance with the present invention this chamber is formed conically with the base thereof opening into the chamber in which the drifts are formed so that, when the clutch is again started, centrifugal force will cause the material to pass back into the main chamber.

Further objects and advantages of the invention will be apparent from the following description taken in connection with the accompanying drawing which forms a part of this specification and on which—

Figure 1:
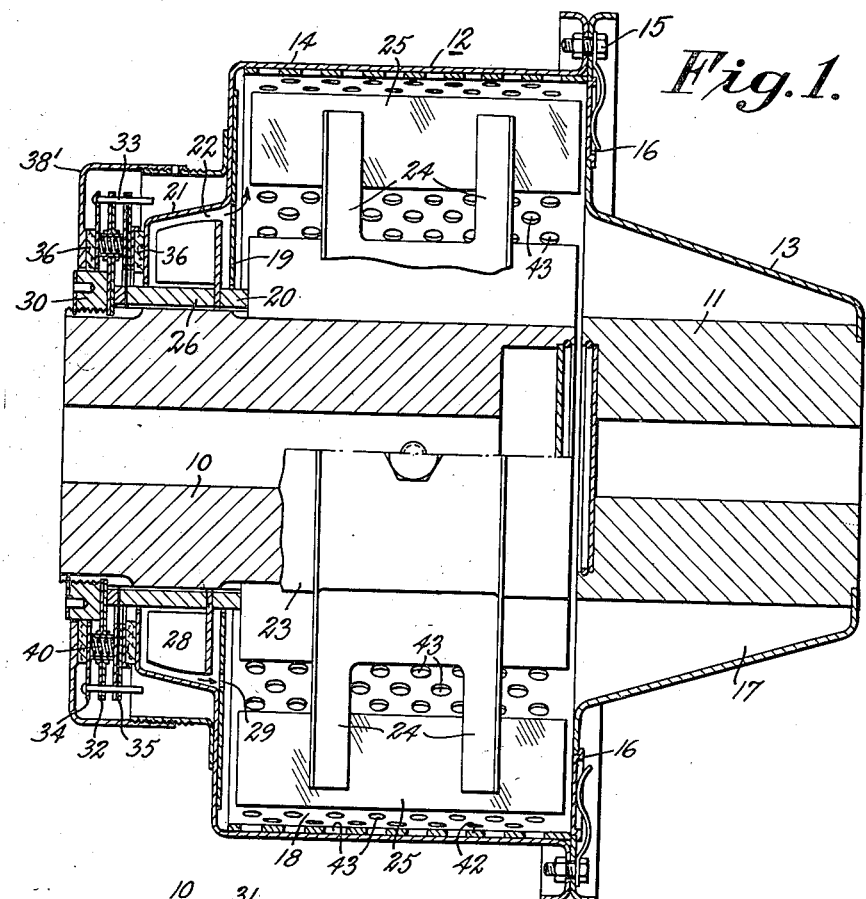
Figure 2:
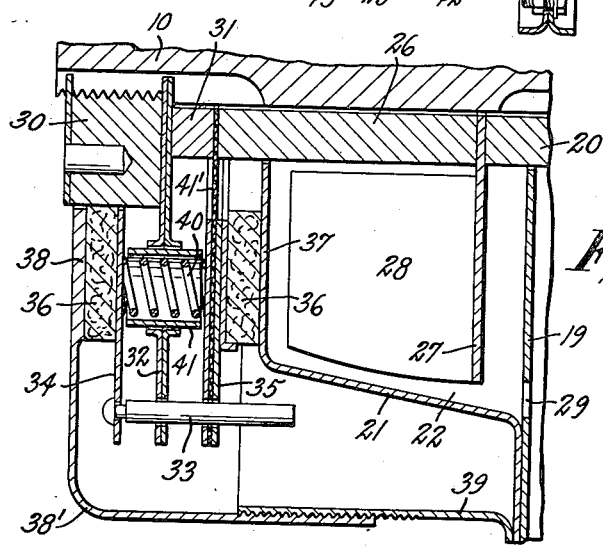

Fig. 1 is a cross-sectional view of a preferred embodiment of the invention; and Fig. 2 is an enlarged view of a portion of the device shown in Fig. 1.

Referring to the drawing, reference character 10 designates a driving shaft or member. Reference character 11 designates a driven shaft or member. These shafts are retained in substantial axial alignment by means of suitable bearings which are not shown in the drawing. Secured to the driven shaft 11 in any suitable manner is a housing 12 comprising a conical portion 13 and a generally cylindrical portion 14. These two portions are secured together by means of bolts 15. Openings are provided in portion 13 which may be closed by means of plates 16. The purpose of these openings is to permit the introduction into, and withdrawal from, the housing of finely divided material which serves as a power transmitting medium, as will be described later. Portion 13 forms a conical chamber 17, the base of which opens into a cylindrical chamber 18 within portion 14. The end of chamber 18 opposite from chamber 17 is partially closed by means of an annular plate 19. Plate 19 is formed with an opening therethrough just large enough to accommodate the shaft 10, or a ring 20 carried by the shaft without contact taking place. A portion 21 of housing 12 forms a conical chamber 22, the inner end of the chamber being bounded by plate 19.

Suitably secured to driving member 10 is a hub 23 which carries arms 24 on which are mounted blades 25. In the embodiment shown, two diametrically opposed blades are provided, but any number of blades equally spaced around the circumference of hub 23 may be employed.

Secured to shaft 10, for instance by being clamped between ring 20 and a sleeve 26, is a disk 27 which carries a plurality of blades 28. Plate 19 is formed with a number of apertures 29 which establish communication between chamber 18 and 22 adjacent to the radially outer boundary of the latter.

Secured to shaft 10, as by being clamped between a nut 30 and a ring 31, is an annular disk 32. Disk 32 is formed with a plurality of apertures adjacent the circumference thereof through which extend pins 33. These pins extend through apertures in sealing disks 34 and 35. The apertures of disks 34 and 35 are of sufficient diameter so that there is a slight amount of play between the disks and the pins, and consequently the disks may move axially with respect to the pins while being carried in rotation thereby and hence in rotation with the shaft 10. Each disk is provided with an annular packing member 36 preferably made of felt or other suitable material. The packing member carried by disk 35 contacts a radial wall 37 of portion 21. Packing carried by disk 34 contacts a radial wall 38 formed on a cupshaped member 38'. Member 38' is preferably screw-threaded onto a cylindrical member 39 which is supported by, and forms part of, housing 12. A plurality of comparatively weak springs 40 are retained within sleeves 41, which sleeves extend through openings formed in disk 32. The opposite ends of springs 40 bear against disks 34 and 35 respectively and force the packings 36 carried by these disks into contact with the radial walls 37 and 38.

A flexible annular diaphragm 41' has its inner edge secured to shaft 10 by being clamped between ring 31 and sleeve 26. The outer part of the diaphragm is secured to sealing disk 35. In the embodiment shown, the diaphragm is secured between two plates which together form the previously referred to sealing disk 35.

A liner 42, formed with perforations 43 therethrough, is secured within the cylindrical portion 14 of housing 12, which is partially filled with finely divided solid material.

The operation of the clutch is as follows:

Upon rotation of shaft 10 by any suitable source of power, blades 25 are caused to rotate and pile the divided material into drifts ahead of them. These drifts are carried around with the blades until the speed of rotation of the blades is sufficiently great so that the centrifugal force acting on the particles of finely divided material packs the drifts into power-transmitting masses, which engage the uneven surface provided by the perforated liner 42. Power is thus transmitted from the blades through the packed drifts to the housing 12 and thence to the driven shaft 11.

When the supply of power to the shaft 10 is discontinued and the shaft consequently slows down, the centrifugal force acting to maintain the drifts as packed, power-transmitting masses is reduced, the drifts are disrupted and the material falls to the bottom of the chamber 18. The drifts are also disrupted if the load becomes too great, which incidentally, causes the clutch to function as an overload release. While the mechanism associated with the clutch is slowing down after the drifts have been disrupted, the material, if allowed to remain in the bottom of chamber 18, produces frictional losses which tend to cause unproductive wear of the clutch members. In accordance with the present invention this friction is reduced by providing the chamber 17, into which a portion of the finely divided material will pass when the drifts are disrupted.

Conical chamber 17 also aids in reducing the starting torque required of the driving motor by reducing the frictional resistance offered to the blades by the finely divided material before the latter is packed into power transmitting masses. As soon as the blades start to rotate, some of the finely divided material is thrown into chamber 17, thereby reducing the resistance offered by the remaining material to movement of the blades. As soon, however, as the speed of rotation of housing 12 reaches a high enough value, the conical form of chamber 17 causes the material therein to return under the action of centrifugal force to chamber 18, where it is packed into power transmitting masses.

Finely divided material which has a tendency to pass out of the chamber 18 between plate 19 and ring 20, first passes into chamber 22. Within this chamber the material is struck by the blades 28 which throw it against the conical wall 21 and, under the influence of centrifugal force, the material passes along this wall and through the openings 29 back into chamber 18. Any material which finds its way from chamber 22 into the space to the left of wall 21 is prevented from going further by means of the packing 36 which contacts the radial wall 37. The flexible diaphragm 41' prevents this material from following along the shaft to the exterior of the clutch.

The arrangement of the disks 34 and 35 which carry the packings 36, is such that axial displacement of shaft 10 with respect to shaft 11, and consequently with respect to walls 37 and 38 does not affect the pressure with which packings 36 engage these walls. This is so because the distance between walls 37 and 38 remains constant due to the fact that these two walls are rigidly secured together. The disks 35 and 34 may move axially along pins 33 and consequently may move axially with respect to disk 32 carried by shaft 10. Also, due to the loose fit between disks 35 and 34 and pins 33, a slight wobbling of the shafts with respect to each other may take place without adversely affecting the cooperation of packings 36 with the walls 37 and 38. Springs 40 are so selected that they exert just enough force to maintain a satisfactory seal without causing undue wear. This sealing and wear are not affected by axial displacement of one shaft with respect to the other for the reason, above pointed out, that the axial distance between walls 37 and 38 does not vary.

While there is disclosed one more or less specific embodiment of the invention, it will be apparent that this is for purposes of illustration only and that the invention is to be limited only by the appended claims viewed in the light of the prior art.

What is claimed:

1. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, packing means including non-metallic packing material carried by said other shaft between said walls, flexible means secured to said other shaft and to said packing means, means separate from said flexible means for transmitting torque between said packing and said other shaft, and means for expanding said packing means between said walls.

2. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, packing means including non-metallic packing material carried by said other shaft between said walls, said packing means being fixed rotationally and movable axially with respect to said other shaft, flexible means secured to said other shaft and to said packing means, means separate from said flexible means for transmitting torque between said packing and said other shaft, and means for expanding said packing means between said walls.

3. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, a pair of circular packing members carried by said other shaft between said walls, and a plurality of resilient means spaced equidistantly around the periphery of said packing members for holding said members in contact with said walls.

4. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, a pair of circular packing members carried by said other shaft between said walls, said packing members being fixed rotationally and movable axially with respect to said other shaft and a plurality of resilient means spaced equidistantly around the periphery of said packing members for holding said members in contact with said walls.

5. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, packing means carried by said other shaft between said walls, said packing means fixed rotationally and movable axially with respect to said other shaft, a flexible member secured to said other shaft and to said packing means and means for expanding said packing means between said walls.

6. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including parallel walls carried by said housing, a pair of packing members carried by said other shaft between said walls, said packing members being fixed rotationally and movable axially with respect to said other shaft, a flexible member secured to said other shaft and to one of said packing members and resilient means for holding said packing members in contact with said walls.

7. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including a pair of parallel radial walls carried by said housing, a radial plate carried by said other shaft between said walls, a pair of radial sealing disks carried by said plate, said disks being fixed rotationally and movable axially with respect to each other and to said plate, packing material carried by said disks and resilient means for forcing said disks apart to hold said packing in contact with said walls.

8. In a clutch for transmitting power from a driving shaft to a coaxially mounted driven shaft and having a housing secured to one of said shafts, the other of said shafts extending to within said housing, a blade secured to said other shaft and positioned to rotate within said housing, and a quantity of finely divided material partially filling said housing, the combination therewith of means for preventing escape of said material between said housing and said other shaft including a pair of parallel radial walls carried by said housing, a radial plate carried by said other shaft between said walls, a pair of radial sealing disks carried by said plate, said disks being fixed rotationally and movable axially with respect to each other and to said plate, packing material carried by said disks, a flexible member secured to said other shaft and to one of said disks and resilient means for forcing said disks apart to hold said packing in contact with said walls.

9. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and a radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, packing means carried by said other shaft between the radial portions of said walls and means for holding said packing means in contact with said radial portions.

10. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and a radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, packing means carried by said other shaft between the radial portions of said walls, said packing means being fixed rotationally and movable axially with respect to said other shaft and means for holding said packing means in contact with said radial portions.

11. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, packing means carried by said other shaft between the radial portions of said walls, said packing means being fixed rotationally and movable axially with respect to said other shaft, a flexible member secured to said packing means and to said other shaft and means for holding said packing means in contact with said radial portions.

12. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and a radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, a pair of packing members carried by said other shaft between the radial portions of said walls and means for holding said members in contact with said radial portions.

13. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and a radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, a pair of packing members carried by said other shaft between the radial portions of said walls, said members being fixed rotationally and movable axially with respect to said other shaft and means for holding said members in contact with said radial portions.

14. In a clutch for transmitting power from a driving shaft to an axially aligned driven shaft and having a housing secured to one of said shafts and forming a cylindrical chamber, the other of said shafts extending to within said chamber, a blade secured to said other shaft and positioned to rotate within said chamber, and a quantity of finely divided material partially filling said chamber, the combination therewith of means for preventing escape of said material between said housing and said other shaft including a wall of said housing having a conical and a radial portion forming an annular conical chamber around said other shaft adjacent to where the shaft enters said cylindrical chamber, the base of said conical chamber being adjacent to said cylindrical chamber, a second blade mounted on said other shaft and positioned to rotate within said conical chamber, another wall having a radial portion carried by said housing, a pair of packing members carried by said other shaft between the radial portions of said walls, said members being fixed rotationally and movable axially with respect to said other shaft, a flexible member secured to one of said packing members and to said other shaft, and means for holding said members in contact with said radial portions.

15. In a clutch for transmitting power from a driving member to an axially aligned driven member, a cylindrical housing secured to one of said members, the other of said members extending to within said housing, a blade secured to said other member and positioned to rotate within said housing, a cylindrical liner in said housing formed with perforations therethrough, and a quantity of finely divided material partially filling said housing and adapted to be packed under the influence of centrifugal force into a power transmitting drift engaging said blade and the perforations in said liner.

16. In a clutch for transmitting power from a driving member to an axially aligned driven member, a housing including a cylindrical portion and a conical portion, said conical portion being secured to one of said members, the other of said members extending to within said housing, a blade secured to said other member and positioned to rotate within the cylindrical portion of said housing, and a quantity of finely divided material partially filling said housing, the base of said conical portion being adjacent to said cylindrical portion, whereby during starting finely divided material is displaced into said conical portion by rotation of said blade before said housing has attained high speed and finely divided material is forced from said conical portion into said cylindrical portion under the influence of centrifugal force upon rotation of said housing at an increased rate.

ROGER SCHWEICH.